US008807506B2

(12) United States Patent
Hanlon

(10) Patent No.: US 8,807,506 B2
(45) Date of Patent: Aug. 19, 2014

(54) RATCHET STAND DEVICE

(75) Inventor: Jared Hanlon, Elk Grove Village, IL (US)

(73) Assignee: Kai Hsiang Traffic Appliances Co., Ltd. (TW)

(*) Notice: Subject to any disclaimer, the term of this patent is extended or adjusted under 35 U.S.C. 154(b) by 237 days.

(21) Appl. No.: 13/100,210

(22) Filed: May 3, 2011

(65) Prior Publication Data

US 2011/0278404 A1 Nov. 17, 2011

Related U.S. Application Data

(60) Provisional application No. 61/330,520, filed on May 3, 2010.

(51) Int. Cl.
*B66F 1/04* (2006.01)

(52) U.S. Cl.
USPC ........................ 248/354.4; 248/354.6; 254/11

(58) Field of Classification Search
CPC ..................................... B60S 9/04; B66F 1/06
USPC ........ 248/354.4, 354.6, 354.7, 407, 408, 409, 248/423, 352, 354.3, 354.5, 292.12, 292.13, 248/200.1, 125.8; 254/11, 14, 45, DIG. 4; D34/31
See application file for complete search history.

(56) References Cited

U.S. PATENT DOCUMENTS 1,320,613 A * 11/1919 Gilcrease ...................... 248/352
1,794,052 A * 2/1931 Anderson et al. ............. 248/352
1,894,293 A * 1/1933 Green ........................... 248/352
1,994,980 A * 3/1935 Cook ............................. 248/97
2,152,895 A * 4/1939 Longtin ........................ 182/205
2,408,181 A * 9/1946 Simonton ....................... 188/67
3,178,146 A * 4/1965 Goodale ....................... 248/352
3,599,923 A * 8/1971 Hunnicutt et al. ............ 248/352
3,642,088 A * 2/1972 Smith .......................... 180/331
4,083,530 A * 4/1978 Linnepe ......................... 254/95
4,447,012 A * 5/1984 Woodruff ................... 242/423.1
4,697,788 A * 10/1987 Arzouman .................... 254/8 B
4,842,311 A * 6/1989 White ............................ 292/85
4,856,747 A * 8/1989 Gano ......................... 248/354.7
5,180,131 A * 1/1993 Few ............................. 248/352
5,183,235 A * 2/1993 Arzouman et al. ........... 254/8 B
5,186,429 A * 2/1993 Linnepe et al. ............ 248/354.1
6,443,413 B1 * 9/2002 Hawkins et al. .............. 248/352
6,565,068 B1 * 5/2003 Arzouman .................... 254/126
6,691,983 B2 * 2/2004 Arzouman ........................ 254/1
7,290,742 B2 * 11/2007 Wang ......................... 248/200.1
7,410,149 B2 * 8/2008 Arzouman .................... 254/8 B
7,566,043 B2 * 7/2009 Chen ............................ 248/616
7,874,303 B2 * 1/2011 Xie ............................ 135/120.3
8,128,306 B2 * 3/2012 Gorza ........................ 403/109.3
2006/0237699 A1 * 10/2006 Porter ......................... 254/93 H
2009/0200528 A1 * 8/2009 Seber et al. ................... 254/131
2010/0258775 A1 * 10/2010 Zhengwei .................. 254/93 H

* cited by examiner

*Primary Examiner* — Terrell McKinnon
*Assistant Examiner* — Eret McNichols
(74) *Attorney, Agent, or Firm* — Cherskov Flaynik & Gurda, LLC

(57) ABSTRACT

A ratchet stand device includes a base joined to a top member such that congruently aligned openings, allow a post having a plurality of locking teeth on one side wall to be snugly inserted through the aligned openings. A ratchet part is pivotally disposed in a side aperture of the top member. The ratchet member may be released, whereupon, a spring urges the ratchet part back to forcibly engage one of the teeth of the post member. The first position of the ratchet member is safely maintained via a locking rod. The selected position for the post member is maintained irrespective of the weight of an object disposed upon a saddle of the post, until the object is removed and the locking rod is removed.

18 Claims, 11 Drawing Sheets

146
226
26
24
182
236
144
140
142
12
162

Figre 10C

RATCHET STAND DEVICE

This utility application claims the benefit of Provisional U.S. Utility Application No. 61/330,520 filed on May 3, 2010 , the contents of which is hereby incorporated by reference.

TECHNICAL FIELD

The present disclosure relates generally to lifting implements, and, more particularly, to a stand and lifting device having a ratchet mechanism.

BACKGROUND OF THE INVENTION

Lifting devices, such as moveable platforms have been used for many years. These lifting devices allow for the vertical movement of a weight.

Most lifting devices are difficult to operate and suffer from safety problems. A primary safety issue with lifting devices is the unintended release of the lifting mechanism under load. Therefore, many ratchet devices include a locking mechanism. However, in prior art devices, the locking mechanism is subject to unintentional triggering and therefore unintentional release of the weight.

Thus, it is clear that there is an unmet need for a lifting device, namely a ratchet stand, that protects the user from unintentional release of the weight placed thereupon, using as few mechanisms as possible.

SUMMARY OF THE INVENTION

An object of the present invention is to provide a jack stand that overcomes many of the disadvantages of the prior art.

Another object of the present invention is to provide a light weight jack stand for the static support of vehicles and other heavy objects. A feature of the invention is the use of stamped foundation members. An advantage of the invention is the minimization of weight of the device and maximization of strength.

Yet another object of the present invention is to provide a jack stand to securely support heavy objects. A feature of the invention is a surface which has a topography which is complementary with a surface found on the object to be supported. An advantage of the invention is the elimination of the object inadvertently dislodging from the jack.

A further object of the invention is to provide a jack stand with redundant safety features. A feature of the invention is the combination of ratchet surfaces and complementary ratchet engaging surfaces which are spring biased to a contact position and further held in that contact position with a separate locking mechanism. An advantage of the invention is that one ratchet engaging means operates separately from another ratchet engaging means so as to assure jack function.

BRIEF DESCRIPTION OF THE DRAWINGS

These and other objects, advantages and novel features of the present invention, as well as details of an illustrative embodiment thereof, will be more fully understood from the following detailed description and attached drawings, wherein:

FIGS. 10A-C are three views of an alternate embodiment of the locking mechanism of the invention.

DESCRIPTION OF THE PREFERRED EMBODIMENT

Figure 1:
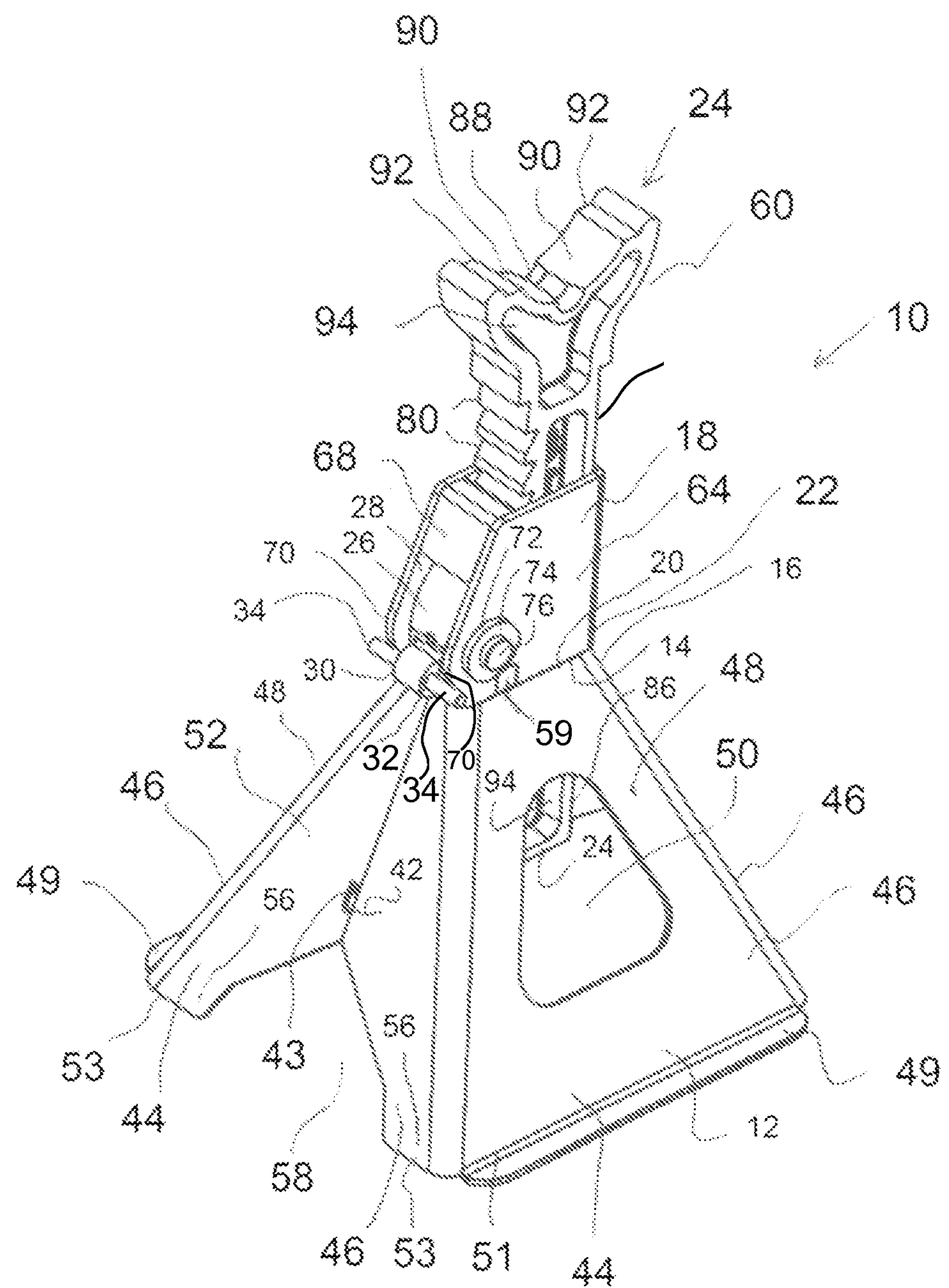
FIG. 1 is a perspective view of a ratchet stand device in accordance with the present invention.

A ratchet stand device in accordance with the present invention is denoted in FIG. 1 as numeral 10. The ratchet stand device 10 is fabricated from a rigid material such as steel and includes a base member 12 having a proximate pyramid configuration. An upper portion 16 of the base member defines an aperture 14. A top member 18 of the device 10 includes a lower portion 22 having a downwardly directed periphery defining an aperture 20. As such, the periphery of the lower portion 22 is adapted to receive the upper portion 16 of the base member 12 so as to be integral with the base member 12 upon assembly. This causes the apertures 20 and 14 to be congruently aligned. A post member 24 is vertically disposed and snugly inserted through the aligned apertures 20 and 14, such that the apertures and the post member are coaxial with the longitudinal axis of the device.

The base member 12 can be formed via casting or punching methods. This provides a strong base member 12 and allows for additional items to be welded/placed into the open cavity of the base member 12, for example a level and or light. A materials savings is also realized when using the casting or punching methods versus cutting and forming the base.

A ratchet member 26 is disposed in a side aperture 28 of the top member 18, the ratchet member 26 having a laterally directed release handle 30. An embodiment of the invention has the release handle integrally molded with the ratchet member. Portions of the release handle define an aperture 32 transversely extending therethrough to receive a locking rod 34. The aperture extends in a direction substantially perpendicular to portions of the ratchet member which engages the post 24 such that the aperture extends in a direction that is parallel to the axis of rotation of the ratchet member 26. The locking rod 34 maintains the position of the post member 24 after its insertion into the congruently aligned apertures 20 and 14.

Figure 5:
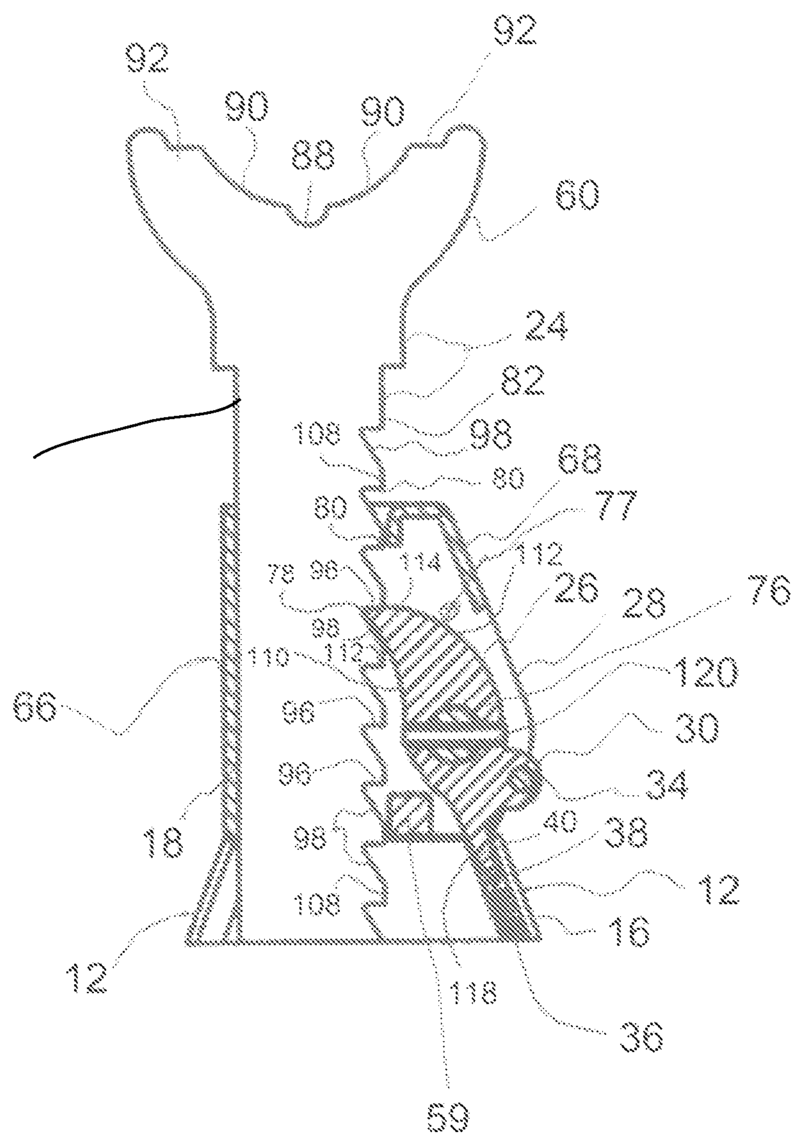
FIG. 5 is a sectional view taken along line 5-5 in FIG. 3.

As can be seen in FIG. 5, a bias spring 36 has an upper end 38 connected to a lower end 40 of the ratchet member 26. A depending or lower end of the spring is connected to an anchor point such as an inwardly disposed protuberance or other such perturbation 42 (see FIG. 1) of the base member 12. This anchor point provides a means for keeping the bias spring 36 under constant tension irrespective of the position of the ratchet member 26.

Support Walls

Details

The base member 12 includes a relatively large rectangular configured bottom portion 44 when compared to the smaller rectangular configured top portion 16. The top portion 16 of the base is axially aligned with the bottom portion 44. The disposition of the top portion 16 relative to the bottom portion 44, results in four comparably dimensioned inclined trapezoidal configured side walls 46. A first pair of opposing side walls 48 defines a first pair of horizontally aligned apertures 50 there through. The first pair of opposing apertures 50 are centrally disposed in the first pair of opposing side walls 48 such that the apertures 50 are adapted to receive a cooperatively dimensioned base stabilizing member, such as a length of rod, pipe or board (such member not part of the invention) to stabilize and/or prevent the device 10 from moving in a direction perpendicular to the base stabilizing member. The first pair of opposing side walls 48 include stabilizing portions or lips 49 formed by bending an extended portion of the side walls 48, or by integrally joining the stabilizing portions to bottom edges 51 of the first pair of side walls 48 such that the stabilizing portions 49 extend horizontal (either laterally as shown, or medially) to promote the congruent engagement of the stabilizing portions 49 upon a cooperating floor portion.

The lips 49 provide a means for distributing load from the base member 12 to the floor portion, thereby reducing deformation and/or damage of the bottom edges 51 of the base member 12 and preventing damage to the floor portion otherwise engaged by the bottom edges 51. Although not depicted, additional and similar stabilizing portions 49 could be added to edge portions 53 of the second pair of opposing side walls 52. As such, a feature of the first pair of side walls 48 is that, during use, substantially the entire length of the depending edge of those side walls is supported by, and makes contact with, the support surface, such as shop floor, ground, driveway or the like.

A salient feature of the device 10 is the stability of its floor-engaging portion or stabilizing portions 49, referred to herein as "anti sink feet." The preferred method of achieving this feature is by stamping rather than welding. When the base member 12 is stamped, the stabilizing portions 49 are aligned with the first pair of opposing side walls 48. The stabilizing portions 49 are then bent to the depicted position thereby providing greater contact with the ground or floor surface and a more stable stand 10.

The base member 12 further includes a second pair of opposing side walls 52 that are relatively smaller than the first pair of opposing side walls 46 inasmuch as this second pair of side walls 48 does not feature an aperture with a lower lip extending substantially across its widest point. (As discussed above, the first pair of side walls 46 have regions forming an aperture with a lower periphery of each aperture substantially extending across its widest point.) Rather, this second pair of side walls 52 features a second pair of opposing apertures 58 or openings that form a tunnel way defined by a first opening of one of the second pair of side walls 52 in registration with a second opening formed in an opposing, second of said second pair of side walls 52. This opening resembles an inverted "U" or "V", such that the walls comprising the second set of sidewalls 52 do not include a bottom lip. Rather, the opening directly opposes the device 10 support surface, whether that support surface is a garage floor, a roadway, or other flat plane. Short "legs" 54 and 56 define the laterally disposed regions of the tunnelway.

As described supra, the second pair of side walls 52 includes the second pair of horizontally aligned apertures 58 therethrough. The second pair of opposing apertures 58 are disposed in a lower center portion of the second pair of side walls 52 such that a medial portion of the base side (i.e., the bottom lip) of each side wall 52 is missing, thereby allowing a second similar base stabilizing member (not part of the invention) to be inserted through the aligned second pair of apertures 58 to further stabilize the device 10 and/or prevent the device 10 from moving in a direction perpendicular the second base stabilizing member. The laterally disposed edge portions 53 of the walls 52 define legs which extend in a generally vertical direction.

The first and second pair of apertures 50 and 58 are vertically and cooperatively "offset" to allow both pairs of apertures 50 and 58 to simultaneously receive their respective base stabilizing members, thereby preventing movement of the device 10 in any horizontal direction and resulting in the safe elevation of a support portion of an object (not depicted) that is ultimately disposed upon a saddle portion 60 of the post member 24 of the ratchet stand device 10. An embodiment of the device features the second pair of apertures such that each aperture 58 of the second pair of apertures has an apex that is situated above the floor the same distance as is the center of each aperture 50 of the first pair of apertures.

The base member 12 also includes a transversely extending guide bar 59 (see FIG. 5) disposed in the upper portion 16 of the base member 12 for snugly capturing a lower portion 86 of that side of the post member 24 defining the teeth 80. An opposite, longitudinally extending side 83 of the post member (which does not define teeth) is in close spatial relationship with an interior surface of the housing formed by the top member 18. This allows the post member 24 to be inserted through the top member 18 and into the base member 12, while maintaining the post member 24 in a substantially axially aligned position with the top member 18 and base member 12.

After the post member 24 has been inserted a required distance into the base member 12, the guide bar 59 maintains the substantially aligned positions of the post member 24, the top member 18 and the base member 12 even after the support member of an object being elevated is disposed upon the saddle portion 60 of the post member 24. This prevents the post member 24 from disengaging the ratchet member 26 while the lifted object rests upon the saddle portion 60.

Figure 2:
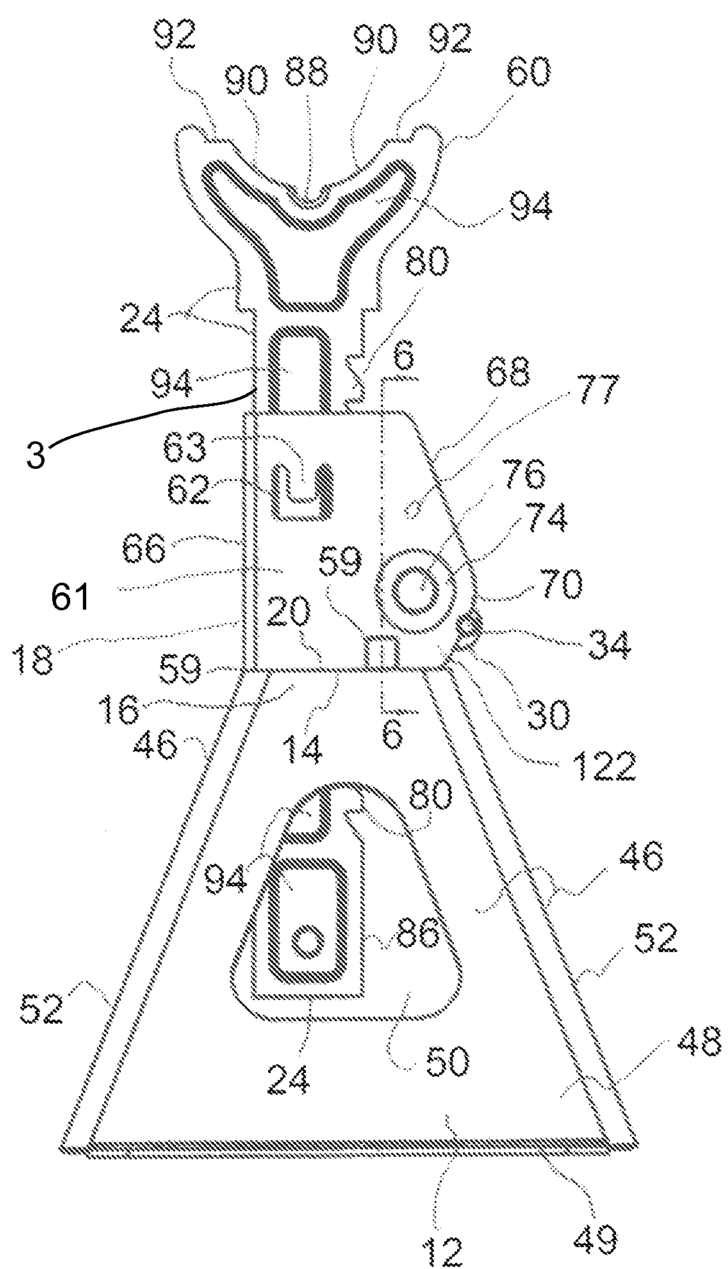
FIG. 2 is a front elevation view of the ratchet stand device of FIG. 1.

Viewing FIG. 2, the top member 18 includes a planar front wall 61 a portion of which forms a substantially "U-shaped" front aperture 62 to enable visual inspection of the interior of the top member 18. Thus, the aperture 62 enables a user to visually inspect the post member 24 after the post member 24 is inserted into the top member 18. The U configuration not only allows for the viewing of the post member 24, but also prevents a user's finger from being inserted into the front aperture 62 thus preventing injury.

The configuration of the front aperture 62 further allows a depending periphery portion 63 of the aperture to be bent inward after the post member 24 is initially placed into the base member 12. The bending portion 63 is inwardly disposed a distance that corresponds to the depth of a cooperating recess 94 or axially extending channel in the post member 24. The now inwardly projecting bent portion 63 provides a means for keeping the post member 24 from being separated from the device 10.

Opposing the planar front wall 61, the top member 18 further includes a planar back wall 64, a planar left side wall 66, and a planar, inclined, partial right side wall 68, which defines the opening or the aperture 28 that receives the ratchet member 26. Medially directed surfaces of lower portions of the front and back walls 61 and 64 define arcuate perturbations 70 (see FIGS. 1 and 2). The arcuate perturbations 70 include axially aligned apertures 72 that receive bushings 74 to rotationally support a cylindrical rod 76 upon which the ratchet member 26 is secured.

As shown in FIG. 2, the post member 24 includes a saddle portion 60 for receiving a support portion of an object (not depicted) that is ultimately supported by the device 10. The post member 24 has a lower portion 86 beneath the saddle portion 60 configured to snugly insert through the aligned apertures 20 and 14 of the top member 18 and base member 12. The saddle portion 60 includes a plurality of nested recesses for snugly receiving corresponding configurations of the support portion of the object ultimately supported by the ratchet stand device 10. The plurality of nested recesses include, when taking a front view of the device 10, cylindrical 88, arcuate 90 and multiplanar (e.g., rectangular) 92 configurations for receiving complementary configured support portions of the object to be supported/elevated by the device 10. In an embodiment of the invention, the post member 24 further defines relatively large recesses 94 situated between the first 82 and second side walls 83 along longitudinally extending portions of the post member 25. These recesses provide a means for reducing the weight of the post member 24, thereby reducing the amount of manual force required to elevate and insert the post member 24 into the top member 18 of the device 10.

Referring to FIG. 5, the cylindrical rod 76 and the ratchet member 26 secured thereto ultimately rotate, when urged by a user's thumb, a distance that separates an edge configured engagement portion 78 of the ratchet member 26 from one of a plurality of locking teeth 80 vertically aligned and integrally formed in a first side wall 82 of the post member 24, thereby allowing the post member 24 to be lowered into and through the top member 18, but only upon user actuation.

Each tooth contained in the plurality of locking teeth 80 of the post member 24 has a configuration that includes a substantially planar bottom wall 96 and an inclined wall 98 that forms an acute angle with the bottom wall 96. The acute angle is substantially about 45-60 degrees, and preferably about 60 degrees but may vary, together with the configurations of the bottom and inclined walls 96 and 98, depending upon the weight of the object disposed upon the saddle portion 60 of the post member 24. The greater the weight, the lesser the angle of the inclined wall 98 and the greater the extension of the inclined wall 98, thereby providing more stability when the edge configured engagement portion 78 of the ratchet member 26 engages one of the plurality of teeth 80.

Figure 7:
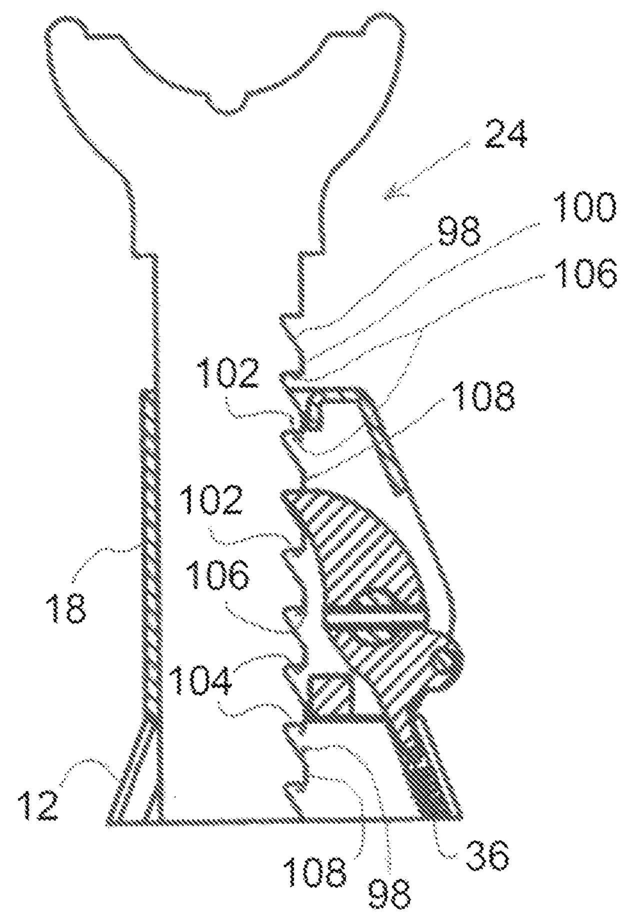
FIG. 7 is the same sectional view depicted in FIG. 5, but with modified locking teeth 100 and a modified ratchet member 126 depicted therein.
Figure 8:
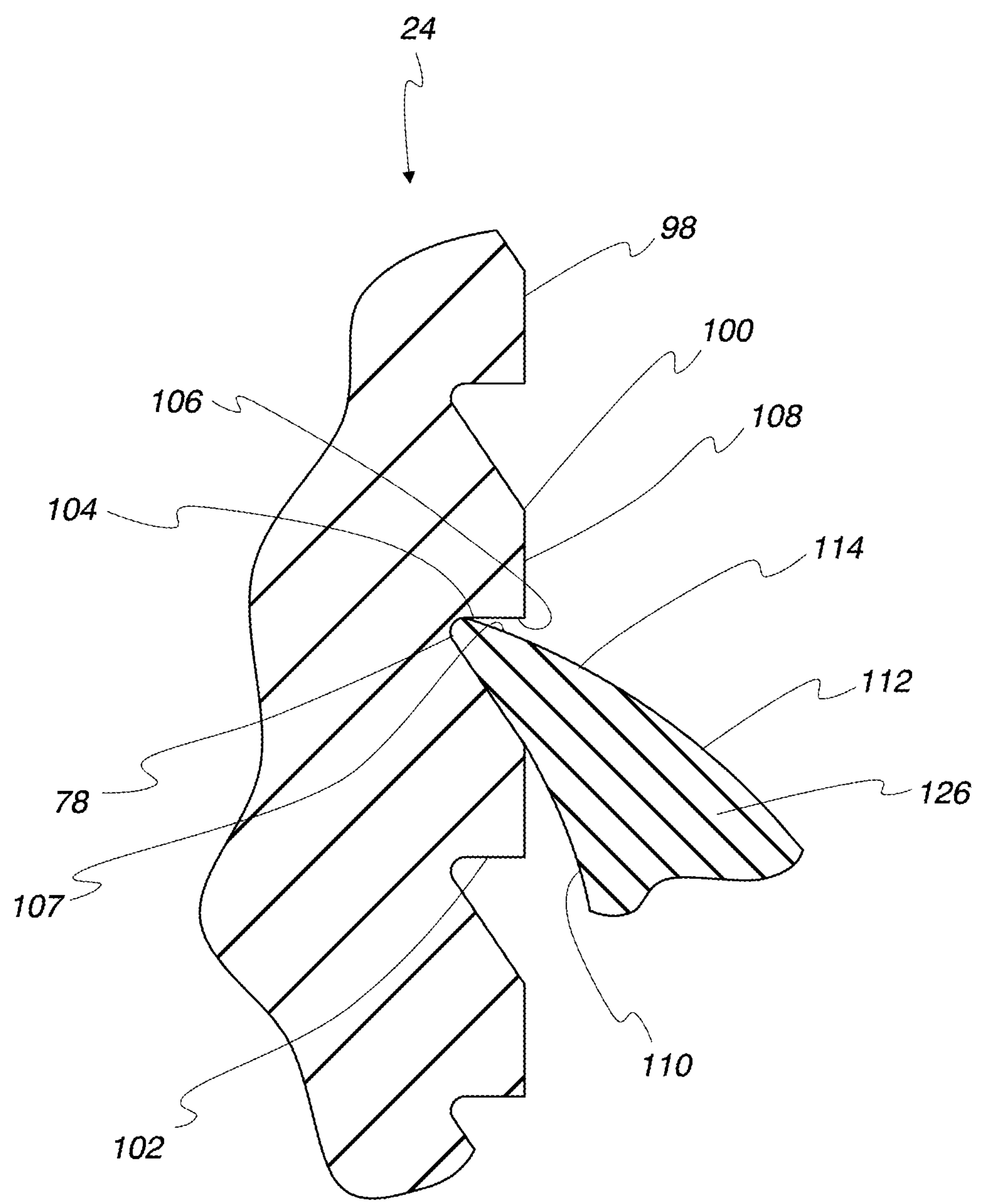
FIG. 8 is a cutaway view of the modified ratchet member.

Referring to FIGS. 7 and 8, in an embodiment, the plurality of locking teeth 80 includes a plurality of modified locking teeth 100. Each of the modified locking teeth 100 is defined by a bottom wall 102 with a planar inner portion 104 integrally joined to a protruding outer portion 106. The protruding outer portion 106 prevents a cooperating protruding portion 107 of a modified ratchet member 126 from disengaging the modified locking teeth 100 as the post member 24 is further extended or extracted from the top member 18 to increase the elevation of the object above the base member 12 of the device 10.

The modified locking teeth 100 include substantially the same inclined wall 98 of the plurality of locking teeth 80. The inclined walls 98 of the plurality of modified locking teeth 100 engage or intersect adjacent bottom walls 102 of adjacent teeth 100 for maximizing the quantity of teeth, thereby increasing the number of elevated positions provided by the device 10. The inclined walls 98 may include a substantially vertical planar portion 108 that intersects or is otherwise integrally molded with cooperating bottom walls 102 of the modified locking teeth 100, thereby increasing the quantity of weight that can be supported by each one of the plurality modified locking teeth 100 without deforming any of the locking teeth 100 via engagement with the ratchet member 126.

The ratchet member 26 includes inner and outer arcuate walls 110 and 112 that form the relatively pointed engagement portion 78 when taking a front sectional view of the ratchet stand device 10 (see FIG. 5.) The outer arcuate wall 112 includes an upper portion 114 configured to congruently engage the bottom wall 96 of one of the locking teeth 80. The inner arcuate wall 110 is configured to congruently engage the inclined wall 98 of a locking tooth 116 immediately beneath the bottom wall 96 congruently engaged by the upper portion 114 of the ratchet member 26.

Referring again to FIG. 5, a depending region of the ratchet member 26 forms a neck to define a stop portion 118 configured to allow the upper end 38 of the bias spring 36 to be connected under tension to the stop portion 118, irrespective of the stop portion 118 engaging or being disengaged from the upper portion 16 of the base member 12.

Figure 3:
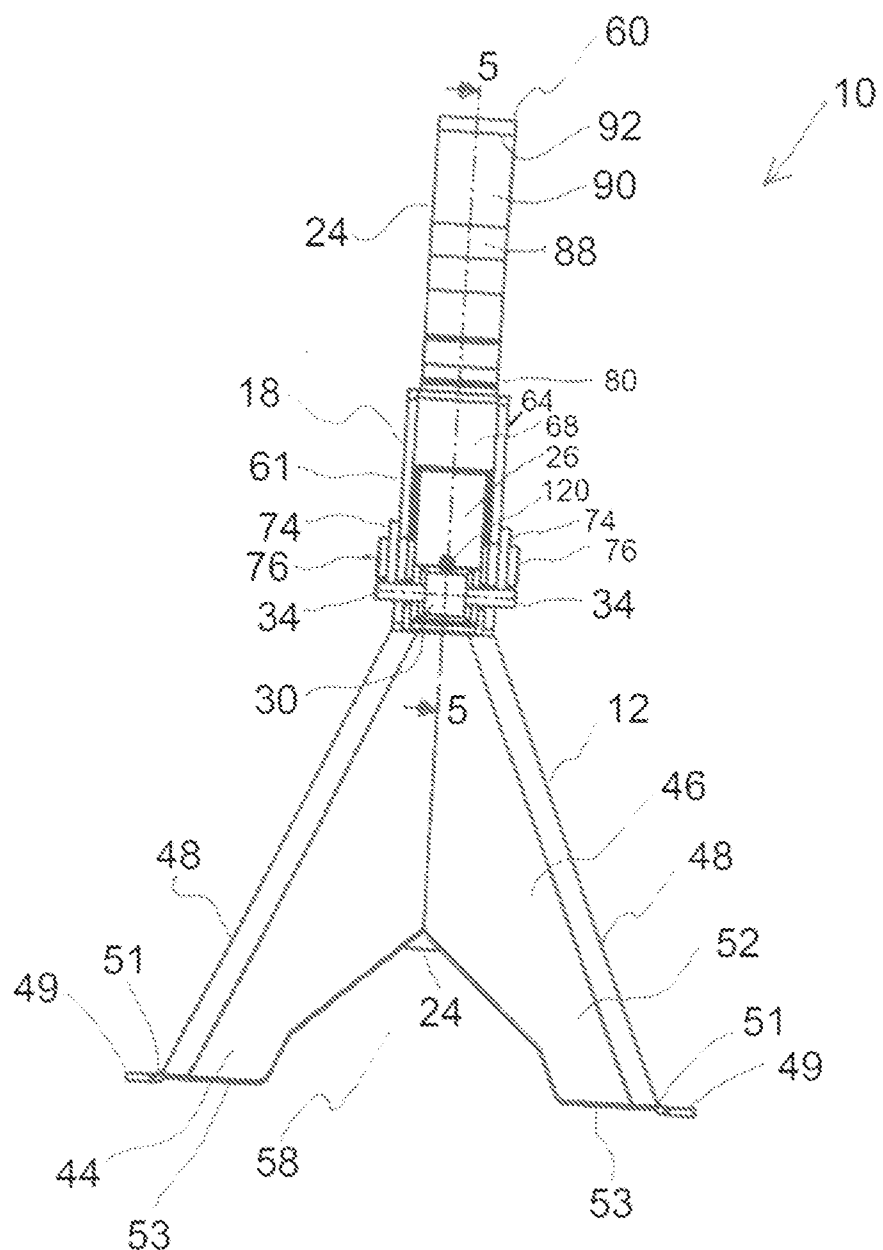
FIG. 3 is a right side elevation view of the ratchet stand device of FIG. 1.
Figure 4:
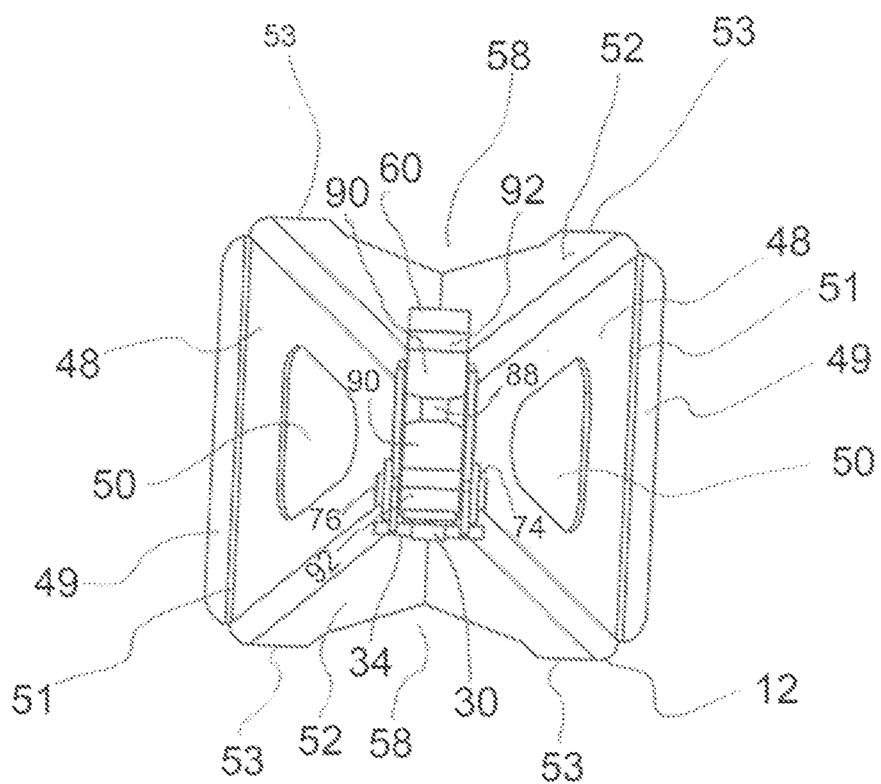
FIG. 4 is a top view of the ratchet stand device of FIG. 1.
Figure 6:
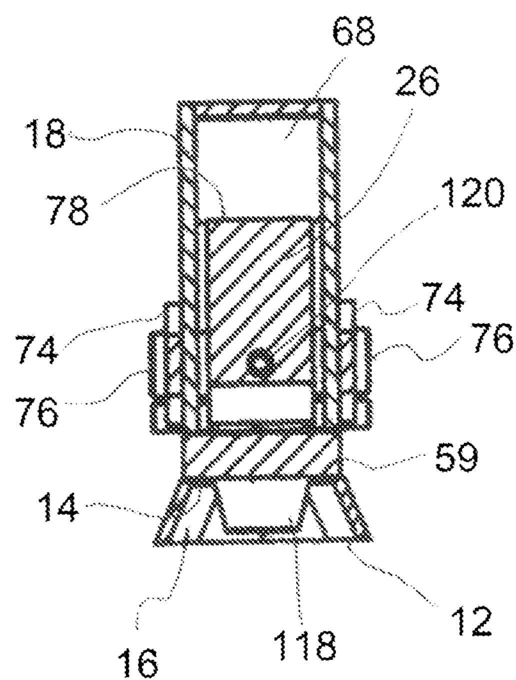
FIG. 6 is a sectional view taken along line 6-6 in FIG. 2.

As depicted in FIG. 3 and FIG. 6, a roll pin 120 attaches the ratchet member 26 to the cylindrical rod 76 via an aperture extending transversely through the ratchet member 26. However, the roll pin 120 is not used in all embodiments. In some embodiments, it is replaced by adding a head or cam to the outside edges of the cylindrical rod 76, or by riveting the ratchet member 26 to the cylindrical rod 76.

The aperture that receives the roll pin can also adapted to receive oil or similar lubricant to engage a surface of the cylindrical rod 76 to which the ratchet member 26 is pivotally connected.

The cylindrical rod 76 is dimensioned to optimize safety. State of the art pins often include an integrally formed lift handle. These are often kicked, causing the rod 76 to dislodge and the load to fall. The instant configuration causes the rod 76 to protrude just enough to prevent the load from being lowered in any other way other than using the release handle 30. This also reduces material costs.

Referring to FIG. 2 and FIG. 5, an optional second locking pin 77 is depicted. This second locking pin 77 is positioned adjacent to (and in the embodiment depicted, superior to) the cylindrical rod 76 and extends transversely through the front and back walls 61 and 64 of the top member 18 so as to prevent lateral movement of the ratchet member 26 away from the teeth 80 of the post member 24. The position of the second locking pin 77 secures the position of the ratchet member 26 relative to the teeth 80, thereby maintaining engagement of the engagement portion 78 of the ratchet member 26 with a selected one of the plurality of teeth 80 of the post member 24.

Alternative Bolt Embodiment

Figure 9:
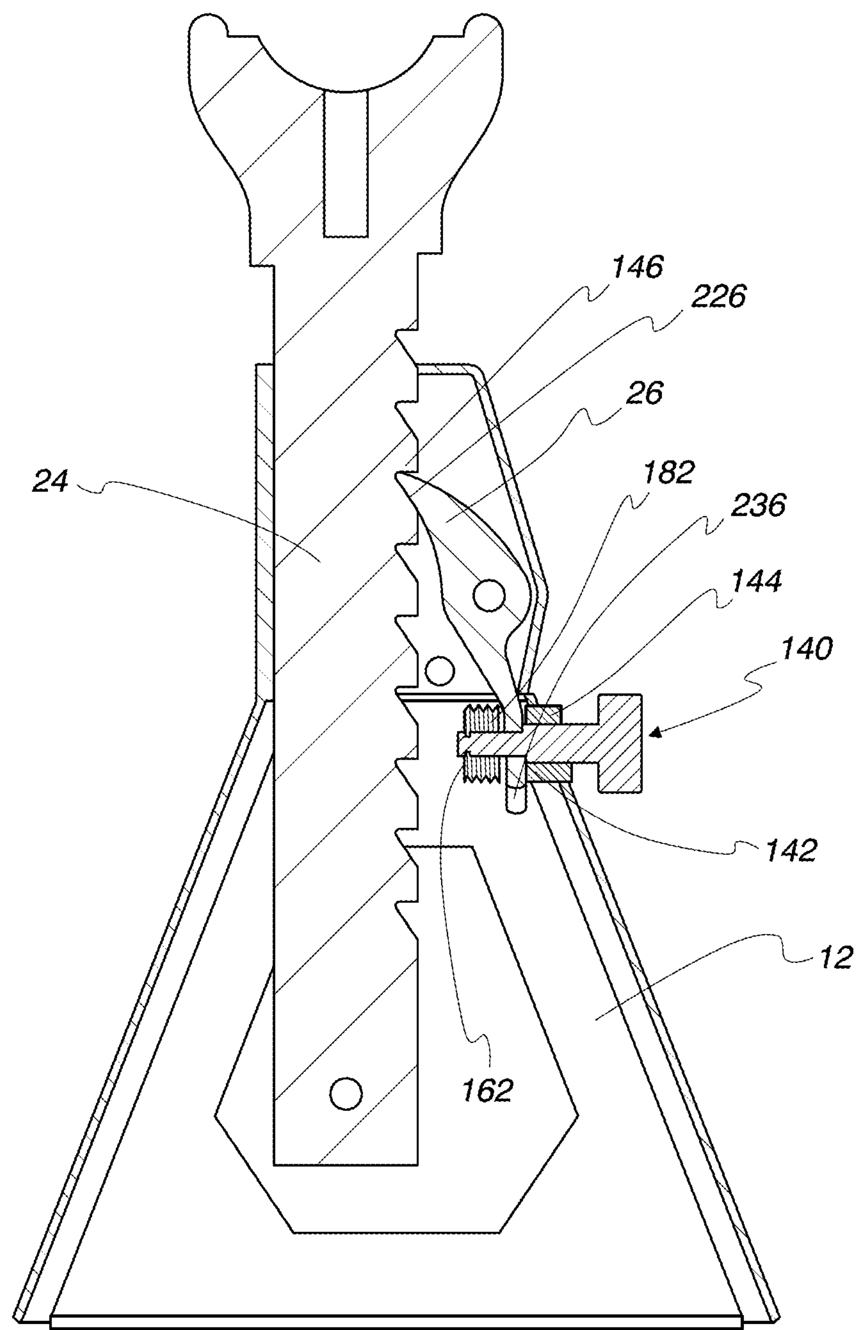
FIG. 9 is a section view of an alternate embodiment of the invention.
Figure 10A:
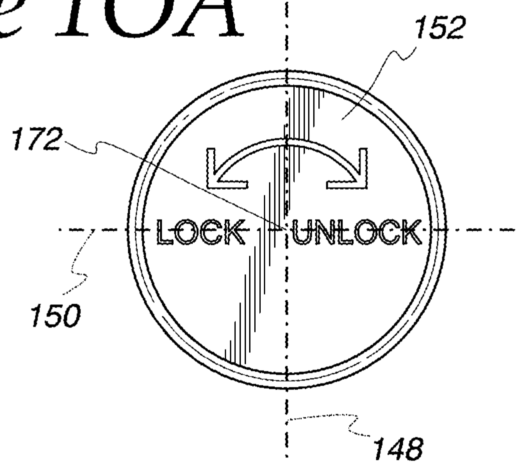
Figure 10B:
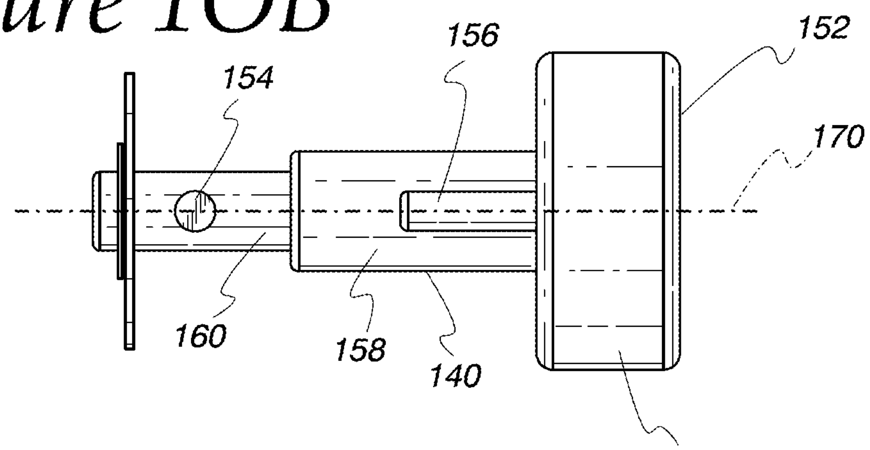
Figure 10B:
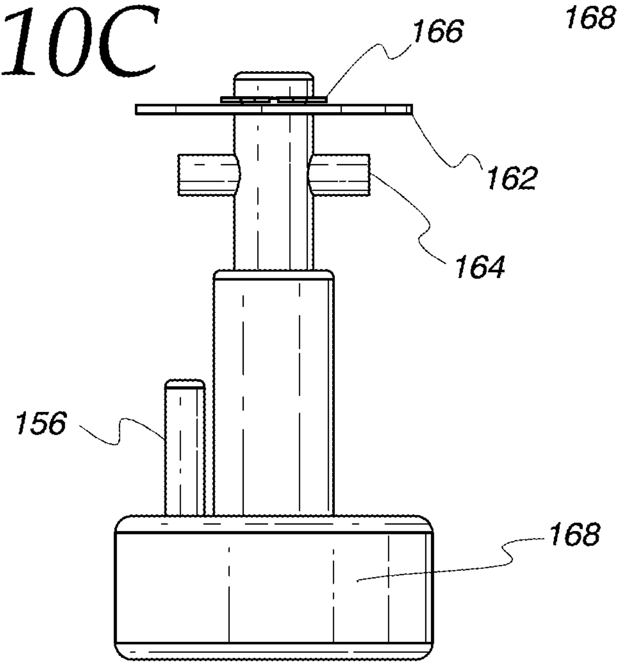

Turning to FIGS. 9-10C, depicted therein in an alternative embodiment for the locking mechanism. The alternative locking mechanism uses a locking bolt 140, which is received by an aperture 142, in the base member 12. In the embodiment shown, the bolt extends medially and generally perpendicularly to the longitudinal axis of the post member.

Upon installation into the aperture 142, the locking bolt is secured in place with an aperture cover 144. The cover 144 prevents the user from accidentally dislodging the locking bolt 140. The use of the locking bolt 140 facilitates encapsulating substantially all of the post member 24 locking mechanism into the interior compartment of the base member 12. As such, the locking bolt 140 and cover 144 function to keep out dirt and debris from the locking mechanism, the details of which are described in relation to FIGS. 10A-10C, below.

The locking bolt 140 reversibly engages the teeth 146 integrally formed with the post member 24 via a ratchet member 26 positioned intermediate of the bolt 140 and post 24. The ratchet member is in pivotal communication with an interior surface of the housing 12. The teeth 146 used in registration with the locking bolt 140 embodiment may be the "standard" teeth 80 of FIG. 5 (having a planar bottom wall 96 and an inclined wall 98). Alternatively, the mechanism of the locking bolt 140 may be employed with the modified teeth depicted in FIG. 7.

The locking bolt 140 engages the ratchet member 26, thereby providing a means for maintaining the ratchet member 26 in the same nested location along the longitudinally extending portions of the post member defining the toothed surface. This nested position is maintained until the locking bolt 140 is released from a locked position. In an embodiment of the invention, the locking bolt 140 is spring biased laterally so as to be biased away from the post 24. As such, a medially-directed force is required to disengage the pawl (i.e. distal end) of the ratchet member 26 from the teeth of the post 24.

As shown in greater detail in FIGS. 10A-C, the bolt 140 comprises several components, in one embodiment. The part of the bolt 140 which extends beyond the base member 12 is the bolt face 152. The bolt face 152 is integrally molded into, or otherwise attached to the bolt handle 168, the periphery of which may be knurled to enhance frictional engagement with the fingers of a user. In embodiments where the bolt face 152 is integrally molded, the indications 174 that appear on the bolt face 152 may be etched or otherwise permanently inscribed on the bolt face 152. In the embodiment shown in FIG. 10A, the bolt face 152 is substantially circular with a first axis 148 and second axis 150 intersecting at the center point 172 of the bolt face 152. In an embodiment of the invention, the bolt 140 is locked into position and released from the locked position by manipulating the bolt face 152 through turning from the indicated locked position to the unlocked position, and vice versa. However, other shapes for the bolt face 152 are used in other embodiments (not shown).

As shown in FIG. 10B, the bolt 140 defines a shank extending perpendicularly from a plane defined by the bolt face, such that the shank extends lengthwise a longitudinal axis 170 of the bolt. The axis 170 extends through the center point 172 of the bolt face 152. From the bolt face 152, the axis extends through the middle of the bolt handle 168. Along the path of the axis 170, extending from the bolt handle 168 is the first larger bolt segment 158, defining a first diameter. Further along the axis 170 extending from the larger bolt segment 158 is the smaller bolt segment 160 defining a second diameter less than the first diameter. An aperture 154 is defined in the smaller bolt segment 154. The aperture 154 center point is perpendicular to the axis formed by the center point of the locking pin 156. The locking pin 156 extends from the bolt handle 168, on the side of the bolt handle 168 opposite of the bolt face 152. The center axis of the locking pin 156 passes through the second axis 150 of the bolt face 152. However, the center axis of the locking pin 156 does not pass through the first axis 148 of the bolt face 152. In other words, the locking pin 156 is located off the center point 172 of the bolt 140 such that its longitudinal axis is radially offset from the longitudinal axis 170 of the bolt. The locking pin 156 is separated from the larger bolt segment 158, in a lateral direction, as is clearly depicted in FIG. 11C.

The aperture 154 of the smaller segment 160 receives a retainer pin 164. In one embodiment, the retainer pin 164 is integrally molded with the rest of the bolt 140. In other embodiments, the retainer pin 164 is slidably received by the retainer aperture 154 as a separate, yet attached, element.

The smaller segment 160 terminates in a disk 162 extending radially from the bolt 140 center axis 170. In one embodiment, the disk 162 is received by an annular groove circumscribing the periphery of the distal end of the smaller segment 160. The disk 162 is kept in place by a spring washer 166 such that the disk is positioned between the washer and a radially projecting shoulder formed in the smaller segment, the shoulder originating from the floor of the annular groove. In another embodiment, the disk is welded or otherwise attached to the smaller segment.

The same bias spring mechanism, described supra, is used to maintain the ratchet member 26 in place. To lock the bias spring in place, the locking bolt 140 is inserted into the base member 12 and the disk 162 applies a lateral force against the bias spring 182. This force causes the proximal end 236 of the ratchet member to rotate outwardly, resulting in a reciprocating inward rotation of the distal end (i.e. pawl) 226 of the ratchet member 26 against the teeth of the post 24. This action results in pawl being firmly nested within a tooth 146 so as to prevent slippage from one tooth to the next.

Figure 11:
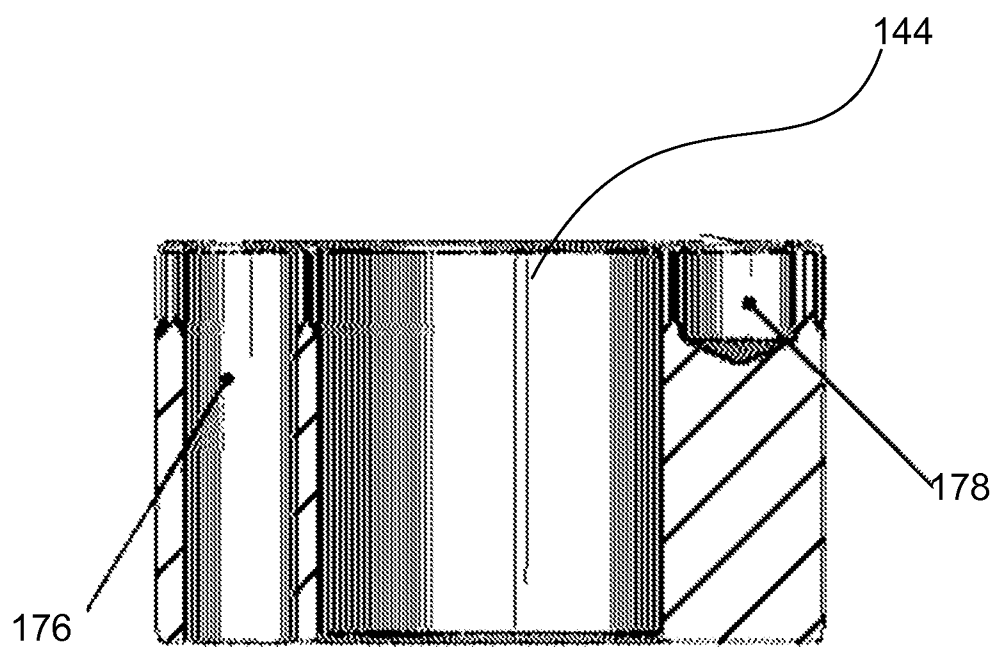
FIG. 11 is a detailed view of one embodiment of the cover for the locking mechanism of the invention.

As is shown in FIG. 11, the locking bolt 140 remains in place in either a locked or unlocked position inasmuch as the aperture cover 144 contains only two receiving apertures 176, 178 which accept the bolt locking pin 156. The first aperture 176 is shallower, while the second aperture 178 is deeper, traversing the entire length of the aperture cover 144. When the bolt 140 is pulled out, it can only be pushed back into either aperture because at any other location along the cover 144, the locking pin 156 would impact the aperture cover 144. When the bolt 140 is in the "unlocked" position, the locking pin 156 is inserted in the deeper aperture 178. The bolt is locked when the locking pin 156 is in the shallower aperture 176. As can be seen in FIG. 9, when the locking pin 156 is in the shallower aperture 176, the bolt 140 exerts a force on the spring 182 and the ratchet member 26.

The apertures 176, 178 prevent any twisting movement of the bolt 140 once it is configured for either position.

Operation Details

In operation, the base member 12 (with the top member 16 integrally joined thereto), post member 24, and the locking rod 34 of the ratchet stand device 10 are initially separated. The base member 12 is disposed upon a level support such as a shop floor capable of supporting an object that will be elevated by the device 10 in a fixed position. A person then depresses the release handle 30 of the ratchet member 26 to allow the post member 24 to be inserted through the top member 16 and into the base member 12, until the saddle portion 60 of the post member 24 is vertically positioned to an initial height sufficient to engage with complementary surfaces of an object to be supported. Upon initial positioning, the device 10 can be further adjusted so as to fully engage and support the object at a predetermined distance above the floor surface.

After the saddle portion 60 has been so vertically positioned, the person removes their thumb from the release handle, whereupon, the bias spring 36 urges the edge configured engagement portion 78 of the ratchet member 26 into a cooperating one of a plurality of locking teeth 80, thereby preventing the post member 24 from moving downward but allowing the post member 24 to be manually urged upward via a "ratcheting action" between the ratchet member 26 and the plurality of locking teeth 80 to "fine tune" the saddle portion 60 position relative to the support portion of the object.

Although the bias spring 36 maintains engagement between the ratchet member 26 and the engaged tooth after the person removes their thumb from the release handle 30, the position of the ratchet member 26 is safely secured after adjusting the position of the saddle portion 60 via the locking rod 34 being inserted through the transverse extending aperture 32 in the release handle 30, such that the locking rod 34 engages lower portions 122 of the arcuate perturbations 70 of the front and back walls 61 and 64 of the top member 18 (See FIG. 1 and FIG. 2). The locking rod 34 maintains engagement between the engagement portion 78 of the ratchet member 26 and the cooperating one of a plurality of locking teeth 80 of the post member 24.

After the object has been removed from the post member 24 such that no weight is acting upon the post member, the post member 24 may be removed from the top member 16 by removing the locking rod 34 from the release handle, then manually pulling the post member 24 (and therefore its teeth-containing surface) upward from the top member 16 such that the medially biased ratchet member 26 engages only the exterior inclined walls 98 (see FIG. 5) of the teeth 80 in a ratcheting action as the post member 24 is elevated above the previous position. This provides a means for always maintaining contact of the ratchet member 26 with the teeth 80 to easily preset the post member 24 for the next job. In instances where the device 10 is to be stowed, or taken apart for cleaning, the user can manually depress the release handle 30 to avoid the ratcheting action, then manually pull with less force the post member 24 from the top member 16, thereby facilitating quicker disassembly of the device 10.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A ratchet stand device comprising:

a base member having a relatively large bottom portion for engaging a floor, and a relatively smaller top portion with an aperture therethrough;

a top member having top and side apertures, said top aperture being vertically aligned with said aperture in said top portion of said base member;

a post member having a saddle portion for receiving a support portion of an object that is ultimately supported by said ratchet stand device, said post member having a lower portion configured to snugly insert through said aligned apertures of said top and base members, said post member having a plurality of locking teeth vertically aligned and integrally formed in a first side wall of said post member;

a ratchet member disposed in said side aperture of said top member, said ratchet member having an engagement portion for engaging said plurality of teeth of said post member and a pivot portion with an aperture therethrough that ultimately receives a pivot bar that allows said ratchet member to be manually rotated about said pivot bar to ultimately engage or disengage said engagement portion from said plurality of locking teeth of said post member;

a release handle integrally joined to a push portion of said ratchet member, said push portion ultimately receiving imparted force from a user's thumb that forcibly urges said push portion such that said engagement portion of said ratchet member disengages from said locking teeth;

a locking bolt comprising a shank and a disk configured to insert through a locking aperture in said base member wherein said disk is located at a distal end of said locking bolt and said disk engages a bias spring limiting movement of said ratchet member and said locking teeth of said post member after said saddle portion engages the support portion of the object, thereby preventing said post member from slipping downward with the support portion thereupon; and the bias spring having an upper end connected to a lower end of said ratchet member, said bias spring having a lower end connected to said base member such that said bias spring is under constant tension irrespective of the position of said ratchet member, said bias spring maintaining the position of said ratchet member until said ratchet member is rotationally urged via said post member and/or via a user pushing upon said release handle, whereupon, said post member is vertically positioned to promote engagement between said saddle portion and the support portion of the object to be elevated above the floor, said post member being locked in place via said locking teeth with said locking bolt's disk preventing downward slippage of said post member, whereby said device safely maintains the elevated position of the object above the floor until said locking bolt is released and said release handle of said ratchet member depressed to allow said post member to be lowered into said base member.

2. The device of claim 1 wherein said base member includes a substantially square configuration when taking a bottom view and a substantially trapezoidal configuration when taking any side view.

3. The device of claim 2 wherein said base member includes a second pair of opposing side walls having a second pair of horizontally aligned apertures therethrough, said second pair of opposing apertures being disposed in a bottom portion of said base member for receiving a stabilizing member therethrough.

4. The device of claim 3 wherein said first and second pair of opposing apertures are cooperatively disposed to allow said stabilizing members to be positioned through each of said first and second pair of opposing apertures, thereby simultaneously stabilizing said base member in multiple directions.

5. The device of claim 1 wherein said top member includes a front aperture for viewing said post member after being inserted into said top member.

6. The device of claim 5 wherein said front aperture is substantially “U” configured for allowing viewing of said post member after insertion into said top member and for preventing a user's finger from being inserted into said front aperture thereby preventing injury.

7. The device of claim 1 wherein said saddle portion of said post member includes a plurality of nested recesses for snugly receiving corresponding configurations of the support portion of the object ultimately supported by said ratchet stand device.

8. The device of claim 7 wherein said plurality of nested recesses include cylindrical, arcuate and rectangular configurations, when taking a front view of said ratchet stand device, for receiving similarly configured support portions of the object supported by said ratchet stand device.

9. The device of claim 1 wherein said post member includes relatively large recesses in front and back portions of said post member to reduce the weight of said post member, thereby reducing the amount of manual force required to elevate and insert said post member into said top member of said device.

10. The device of claim 1 wherein said locking teeth of said post member have a configuration, when taking a front view of said device, that includes a substantially planar bottom wall and an inclined wall forming an acute angle with said bottom wall.

11. The device of claim 10 wherein said acute angle is substantially about sixty degrees.

12. The device of claim 10 wherein said inclined wall of a lower locking tooth engages bottom walls of adjacent teeth for maximizing the quantity of teeth which increases the quantity of elevated positions provided by said ratchet stand device.

13. The device of claim 10 wherein said inclined wall includes a substantially planar portion that engages said bottom wall of a locking tooth of said plurality of upper locking teeth, thereby increasing the quantity of weight supported by each locking tooth without deforming said locking tooth via engagement with said ratchet member.

14. The device of claim 1 wherein said plurality of locking teeth of said post member include a plurality of upper locking teeth having a substantially planar bottom wall.

15. The device of claim 1 wherein said plurality of locking teeth of said post member include a plurality of lower locking teeth having a bottom wall with a planar inner portion integrally joined to a protruding outer portion, said protruding outer portion preventing said ratchet member from disengaging said lower locking teeth as said post member is extracted from said top member to increase the elevation of the object above the base member of said ratchet stand device.

16. The device of claim 1 wherein said ratchet member includes inner and outer arcuate walls that form a relatively pointed upper portion when taking a front sectional view of said ratchet stand device.

17. The device of claim 16 wherein said outer wall includes an upper portion configured to congruently engage a bottom wall of a locking tooth.

18. The device of claim 16 wherein said inner wall includes an upper portion configured to congruently engage an inclined portion of an inclined wall of a locking tooth.

* * * * *